Dec. 11, 1962
W. DE BACK
3,067,554
CASING MACHINE
Filed Aug. 29, 1960
6 Sheets-Sheet 1
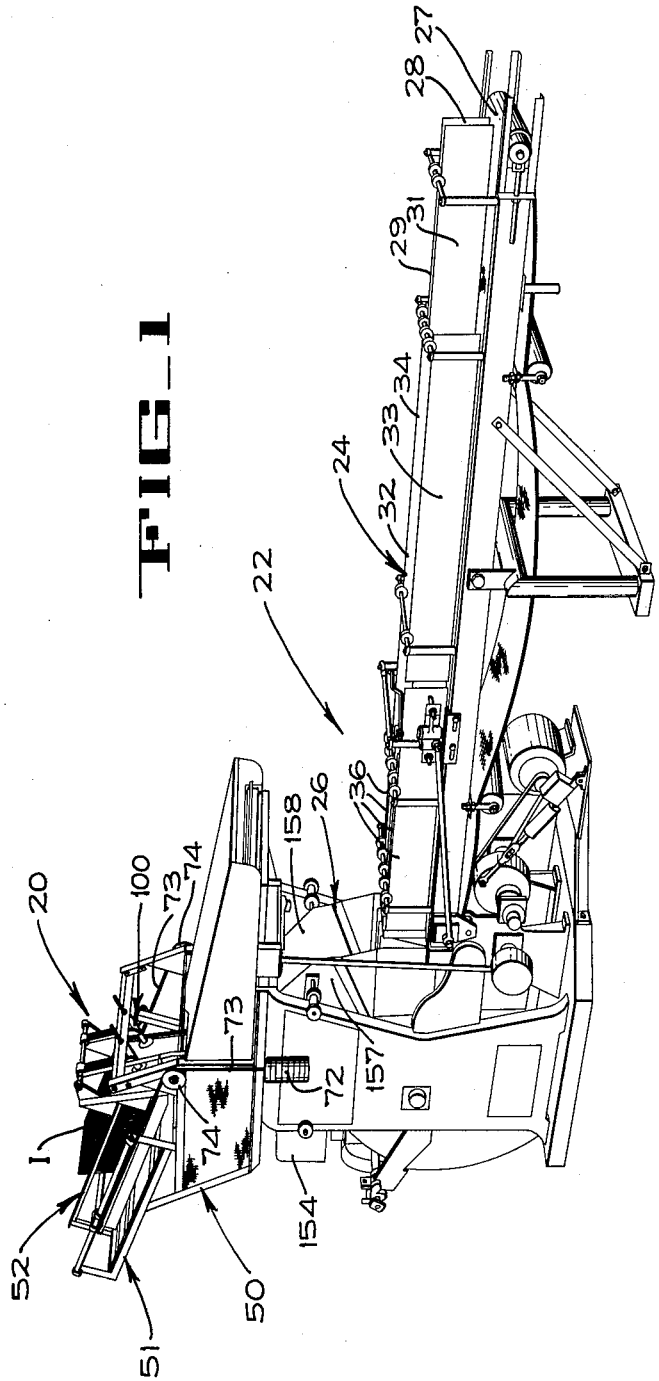
FIG_1
INVENTOR
WILLIAM DE BACK
BY *Hans G. Hoffmeister*
ATTORNEY Dec. 11, 1962   W. DE BACK   3,067,554
CASING MACHINE
Filed Aug. 29, 1960   6 Sheets-Sheet 2
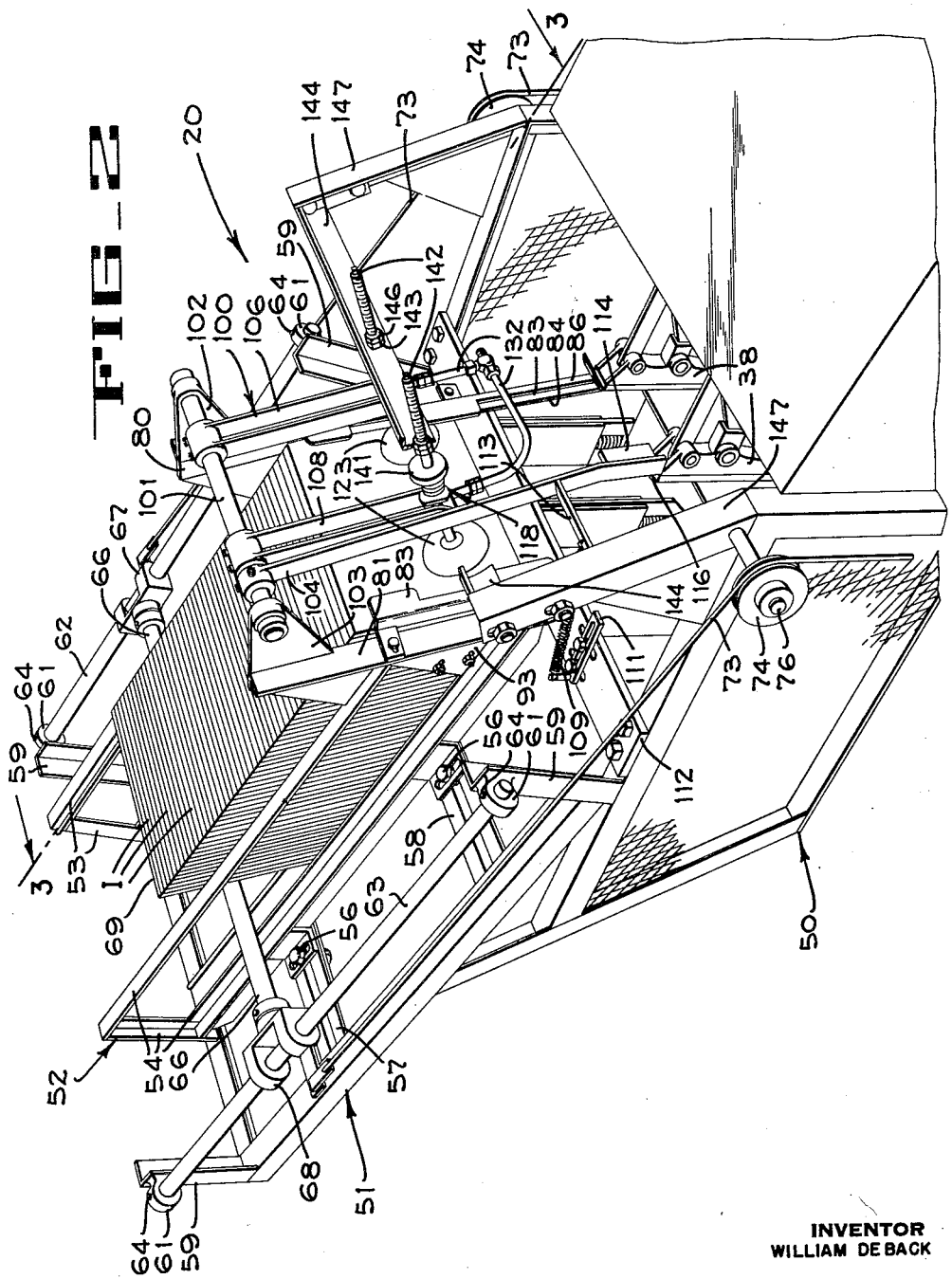
INVENTOR
WILLIAM DE BACK
BY *Hans G. Hoffmeister*
ATTORNEY Dec. 11, 1962     W. DE BACK     3,067,554
CASING MACHINE
Filed Aug. 29, 1960     6 Sheets-Sheet 3
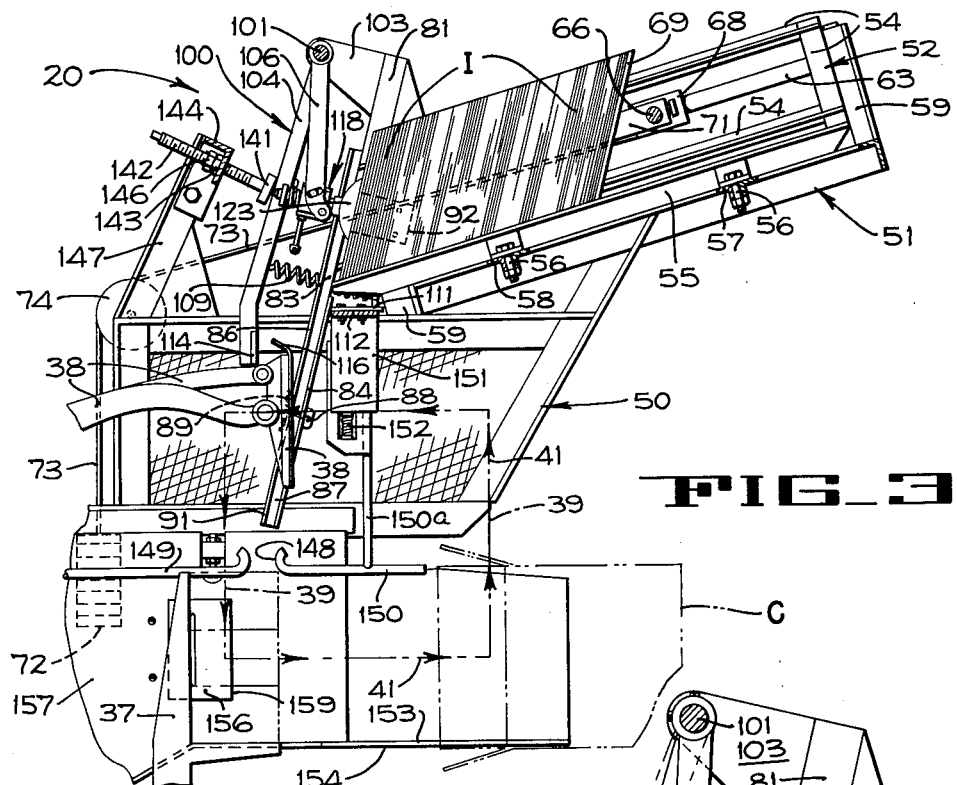
FIG_3
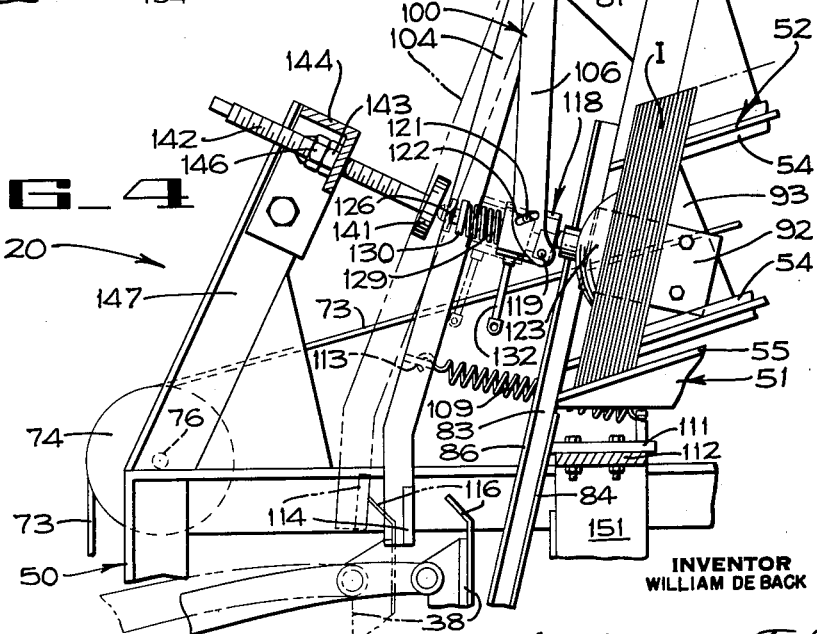
FIG_4
INVENTOR
WILLIAM DE BACK
BY *Hans G. Hoffmeister*
ATTORNEY Dec. 11, 1962
W. DE BACK
3,067,554
CASING MACHINE
Filed Aug. 29, 1960
6 Sheets-Sheet 4
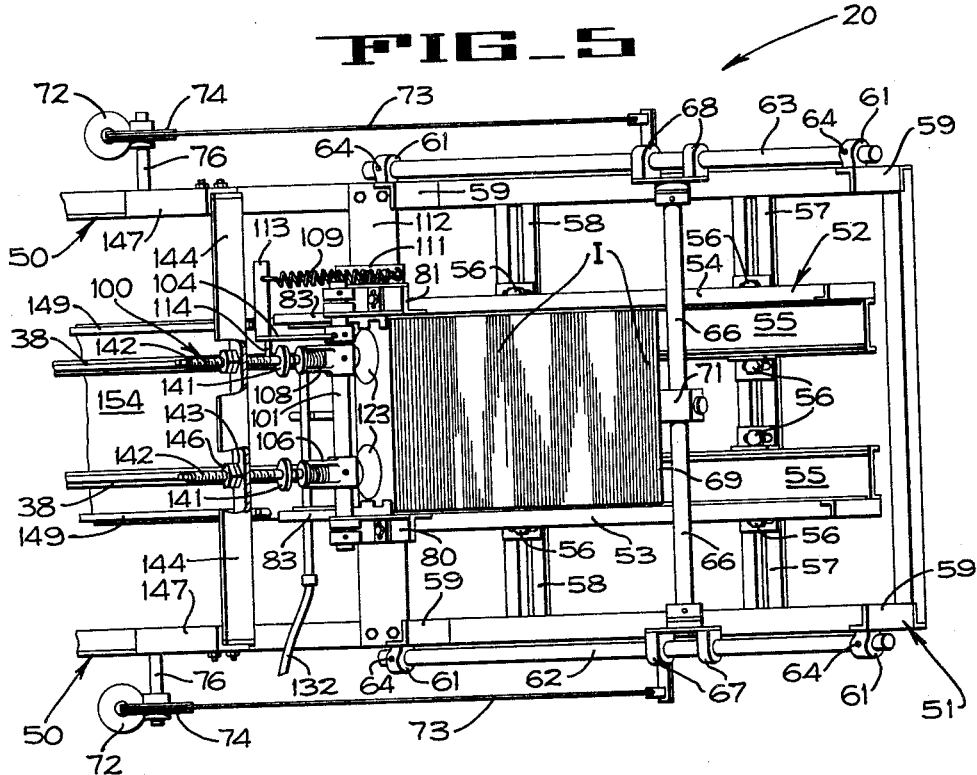
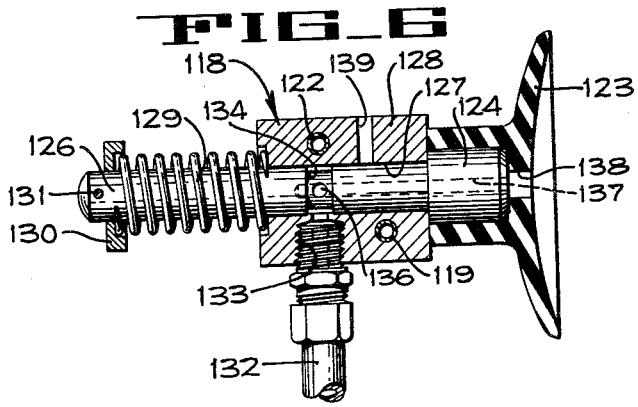
INVENTOR
WILLIAM DE BACK
BY Hans G. Hoffmeister
ATTORNEY Dec. 11, 1962 — W. DE BACK — 3,067,554
CASING MACHINE
Filed Aug. 29, 1960 — 6 Sheets-Sheet 5
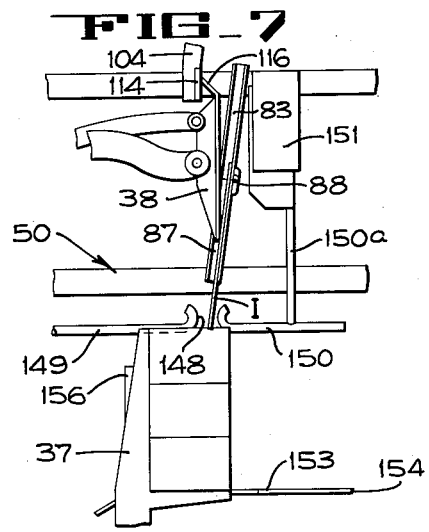
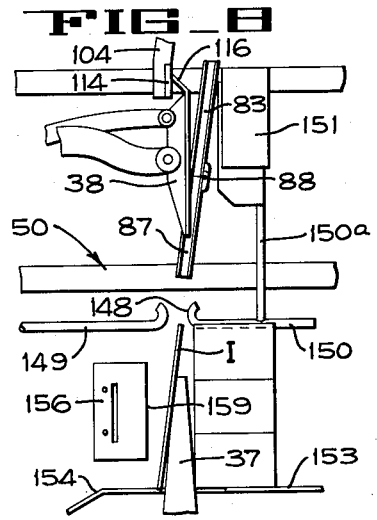
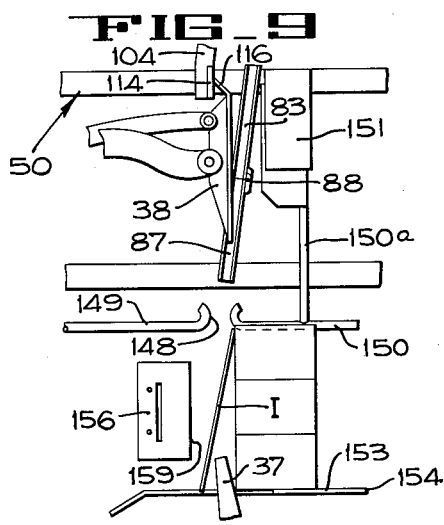
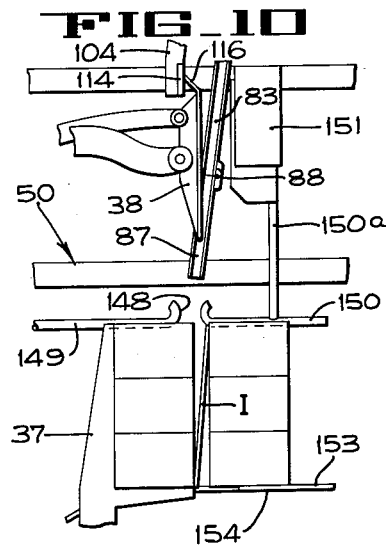
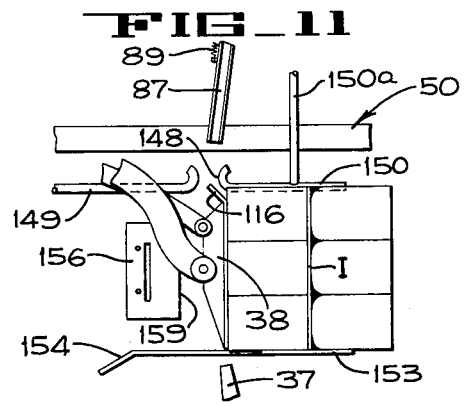
INVENTOR
WILLIAM DE BACK
BY Hans G. Hofmeister
ATTORNEY

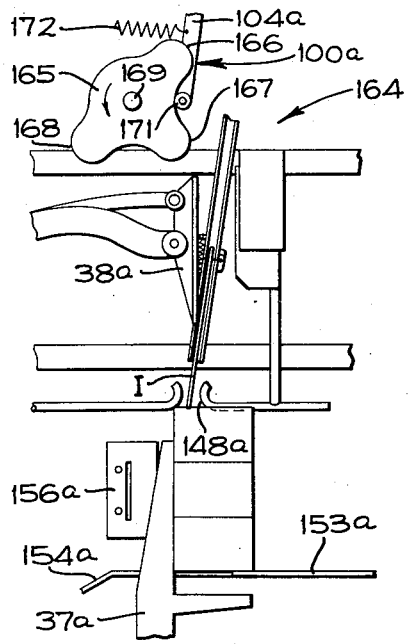
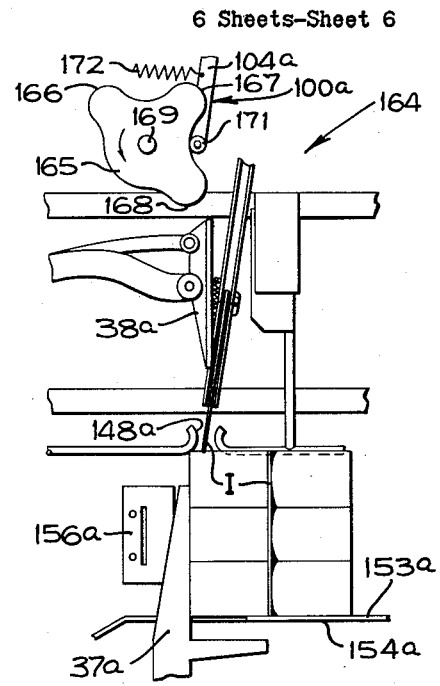
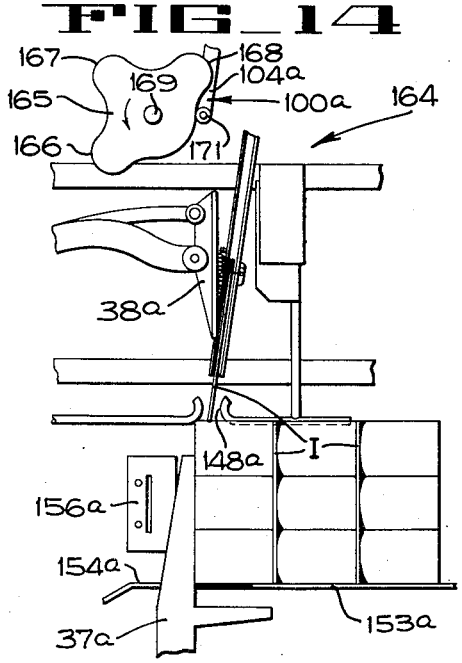
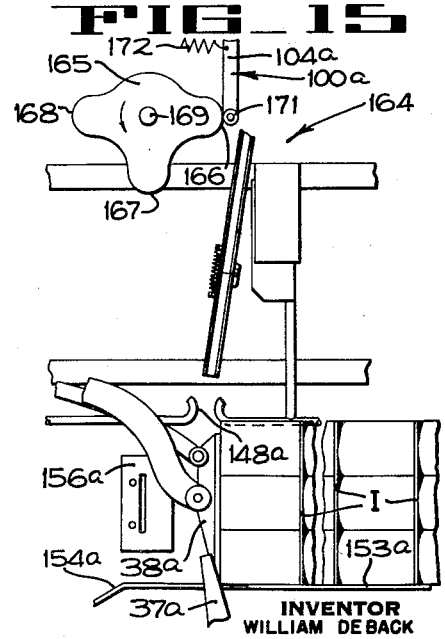

United States Patent Office 3,067,554
Patented Dec. 11, 1962

3,067,554
CASING MACHINE
William De Back, San Jose, Calif., assignor to FMC Corporation, San Jose, Calif., a corporation of Delaware
Filed Aug. 29, 1960, Ser. No. 52,606
7 Claims. (Cl. 53—157)

The present invention appertains to casing machines and more particularly relates to an apparatus for positioning an insert between adjacent tiers of articles being cased.

When packaging tiers of articles such as cans or jars into cases with a continuously operating casing machine, it is desirable to place an insert, such as a cardboard or laminated paper sheet, between the tiers of articles to prevent injury to the same. Heretofore, because of the continuous manner of operation of the casing machine, it has been necessary for an operator to manually place the inserts between the adjacent tiers of articles.

It is therefore one object of the present invention to provide apparatus for automatically positioning inserts between tiers of articles in a casing machine.

Another object is to provide an improved insert positioning apparatus arranged to cooperate with a casing machine to automatically place inserts between adjacent tiers of articles handled by the machine.

These and other objects and advantages of the present invention will become apparent from the following description and the accompanying drawings, in which:

FIG. 1 is a perspective of the insert positioning apparatus of the present invention shown mounted on a casing machine.

FIG. 2 is an enlarged perspective of the insert positioning apparatus, certain parts being broken away.

FIG. 3 is a section taken along lines 3—3 of FIG 2.

FIG. 4 is an enlarged fragmentary section similar to FIG. 3.

FIG. 5 is a plan of the insert positioning apparatus of FIG. 3.

FIG. 6 is a central section of a suction cup assembly.

FIGS. 7 to 11 are operational views showing the sequence of operation of the insert positioning apparatus when arranged to position an insert between two tiers of articles being packed in a case.

FIGS. 12 to 15 are operational views showing the sequence of operations of the insert positioning apparatus when arranged to position two inserts between three tiers of articles being packed in a case.

In FIG. 1, the insert positioning apparatus 20 of the present invention is shown mounted on a case packing machine 22 of the type disclosed in United States Letters Patent No. 2,650,009 to Charles E. Kerr dated August 25, 1953. In general, the case packing machine 22 comprises a line-dividing mechanism 24 adapted to convert a single-file supply line of articles into a multi-file supply line, and a case loading mechanism 26 adapted to transfer tiers of articles from the end of the multi-file supply line into a shipping case, crate, or the like.

The line-dividing mechanism 24 comprises an endless belt conveyor 27 which has a transverse width at least equal to the total width of the required number of individual article files. At the entrance of the conveyor 27, a corridor 28 for a single-file line of articles is defined by two parallel vertical guide plates 29 and 31 that are held above the conveyor belt 27 in a manner permitting transverse, longitudinal, and vertical adjustment of their position relative to one another and to the belt conveyor 27. The single-file article corridor 28 extends approximately over the first quarter of the length of the conveyor 27. Another pair of guide plates 32 and 33 are supported above the conveyor 27 at the discharge end of the single file corridor 28 to establish an adjoining article corridor 34 that extends over approximately the two center quarters of the conveyor belt 27 and is of a transverse width equal to the total width of the several article files into which the article line entering through the single-file corridor 28 is to be divided. At the discharge end of the corridor 34, a plurality of vertical partition plates 36 divide the article supply line into four parallel adjacent files which direct the articles onto tiering finger units 37 (FIG. 3) which are horizontal at this time and are arranged to raise the articles into the vertical case loading position of FIG. 3. After each tier of articles is raised into case loading position, a pair of intermittently driven pusher feet 38 are moved along a generally rectangular path 39 in the directions indicated by the arrows 41. The pusher feet 38 are effective to advance two tiers of articles into a case C which case is later discharged from the machine 22.

The above structure has been briefly described in order to point out the manner in which the different parts of the case packing machine 22 cooperate with the insert positioning apparatus 20. If a more detailed description of the case packing machine 22 is desired, reference should be had to the aforementioned Kerr patent.

The insert positioning apparatus 20 (FIG. 1) is mounted on the case packing machine 22 above the case loading mechanism 26. The insert positioning apparatus 20 comprises a frame 50 (FIGS. 2, 3, and 5) having an upper inclined sub-frame 51 which supports a magazine 52. The magazine 52 includes longitudinally extending vertical side frames 53 and 54 (FIG. 2) which are welded to floor members 55 and are connected by bolts 56 to slotted, laterally extending bars 57 and 58 of the sub-frame 51. The side frames 53 and 54 may be adjusted laterally by sliding the bolts 56 to the desired position in the bars 57 and 58 before tightening, in order to adjust the size of the magazine 52 for inserts of different widths.

Pedestals 59 extend upwardly from the corners of the inclined sub-frame 51 and have collars 61 secured thereto as by welding. Longitudinally extending guide rods 62 and 63 are disposed on opposite sides of the magazine 52 and are locked in associated ones of the collars 61 by set screws 64. An insert feed bar 66 extends laterally across the magazine 52 and has yokes 67 and 68 secured on its opposite ends to slidably receive the guide rods 62 and 63, respectively. An insert pusher plate 69 (FIG. 3) is secured to a block 71 which is locked on the feed bar 66 adjacent its midpoint. The pusher plate 69 contacts the uppermost of a plurality of inserts I in the inclined magazine 52 and forces the inserts downwardly toward the lower discharge end of the magazine. The weight of the insert feed bar 66 and supported parts may be all that is required to properly feed the inserts I, however, in the event that more force is required, counterweights 72 (shown at the lower left side of FIG. 3) may be used to add to the downward force. As seen in FIGS. 1 and 5, each yoke 67 and 68 has one of the counterweights 72 connected thereto by means of a cable 73 trained around a pulley 74. Each pulley 74 is journalled on a stub shaft 76 which is secured to and projects outwardly from its associated side of the frame 50.

Inclined angle members 80 and 81 (FIG. 2) of the side frames 53 and 54, respectively, have insert discharge channels 83 bolted thereon. The discharge channels 83 are disposed in position to receive the lateral side edges of the foremost insert in the magazine 52 and to guide the inserts, one at a time, downwardly into the case packing machine 22 between adjacent tiers of articles. Each discharge channel 83 includes an inner flange 84 (FIGS. 3 and 4) and an outer flange 86. The upper portion of each inner flange 84 is cut away to allow the inserts to be individually pulled from the magazine 52 into the discharge channels 83. Each of the discharge channels 83 has a lower extension 87 (FIG. 3) which is pivotally connected thereto by means of a pivot 88 and is normally held in alignment with its associated channel by a spring 89 connected to the outer flange 86 and the outer flange 91 of the associated extension 87. In the event an insert becomes wedged in the extensions 87 of the discharge channels 83, the end portions 87 will move about their pivots 88, upon engagement of the pusher foot 38 with the wedged insert. Thus, the extensions 87 serve as protective devices for the discharge channels 83 which otherwise might be bent.

In order to hold the inserts in the magazine against the urging of the feed bar 66, a resilient leaf spring 92 (only one being shown in FIG. 4) engages each lateral edge of several inserts adjacent the lower discharge end of the magazine 52. The leaf springs 92 are bolted to gusset plates 93, one of which is welded to each of the angle members 80 and 81.

The inserts are withdrawn from the magazine 52 (FIG. 2) by an insert withdrawing device 100 (FIGS. 2–5). The insert withdrawal device 100 comprises a shaft 101 journalled in brackets 102 and 103 welded to the inclined angle members 80 and 81, respectively. An actuating lever 104 and two parallel suction cup arms 106 and 108 are rigidly secured to the shaft 101. A tension spring 109 (FIGS. 3–5) is secured between a bracket 111 bolted to a transverse frame member 112 and a transverse arm 113 welded to the actuating lever 104. The spring 109 constantly urges the shaft 101 to rotate in a counterclockwise direction as viewed in FIG. 4. A pad 114 is welded to the lower end of the lever 104 in position to be contacted by an ear 116 on one of the pusher feet 38 as the pusher feet 38 move toward the left (FIG. 3) to their upper rearmost position. Upon reaching the upper rearmost position, but before the feet 38 move downwardly in their path of travel 39, the actuating lever 104 is moved to the phantom line position shown in FIG. 4, causing the shaft 101 and parts supported thereby to be pivoted in a clockwise direction (FIG. 4).

Each of the suction cup arms 106 and 108 (FIG. 2) is bifurcated and pivotally supports a vacuum valve mechanism 118 (FIGS. 2–6) on a pivot pin 119 (FIG. 4) which extends through apertures in the ends of the associated arms and an aperture in the associated mechanism 118. The pivotal movement of each mechanism 118 is limited by a pin 121 which is secured in an aperture in the unit 118 and is slidably received in arcuate slots 122 in the associated bifurcated arm 106 or 108. Since both mechanisms 118 are identical, the description of one will suffice for both.

Each of the suction valve mechanisms 118 (FIG. 6) comprises a resilient suction cup 123 which is secured to the head 124 of a valve stem 126. The valve stem 126 is slidably received in a cylindrical bore 127 of a valve body 128 and is urged to the left (FIG. 6) in the body by a spring 129 which bears against the body 128 and a collar 130 secured to the stem 126 by a pin 131. A suction conduit 132, which is connected to a suction pump (not shown) is screwed into a port 133 in the valve body 128 and communicates with the cylindrical bore 127. When the head 124 of the valve stem 126 is urged against the body 128 as shown in FIG. 6, an annular groove 134 in the stem 126 and a transverse passage 136 through the stem 126 communicate with the port 133. A longitudinal passage 137 in the stem 126 communicates with the transverse passage 136 and with a port 138 which opens within the interior of the suction cup 123.

When the different parts of each of the vacuum valve mechanisms 118 are positioned as shown in FIG. 6, and when the lever 104 (FIG. 4) is in the solid line position shown in FIG. 4, the suction created by the suction pump causes the cups 123 to firmly grip the foremost insert. When the lever 104 is being moved to the phantom line position as shown in FIG. 4, the foremost insert is carried past the ends of the leaf springs 92 and into the insert discharge channels 83.

A vent passage 139 (FIG. 6) in the body 128 communicates with the cylindrical bore 127. When the valve stem 126 is moved to the right (FIG. 6) with respect to the the valve body 128 so as to align the groove 134 with the vent passage 139, it is apparent that the port 133 will be blocked and the area within the suction cup 123 will be vented to the atmosphere thereby releasing the insert and dropping the same down the discharge channels 83.

In order to move the valve stem 126 to the above-mentioned venting position, each valve stem 126 contacts a disc 141 (FIGS. 2–5) that is secured to a threaded rod 142. Each rod 142 is screwed into a nut 143 that is welded to an angle member 144 and is locked in position by a lock nut 146. The angle member 144 is rigidly secured to inclined arms 147 which are a part of the frame 50. When the actuating lever 104 is moved to the position sown in phantom lines in FIG. 4, each valve stem 126 contacts its associated disc 141 and is moved relatively to the body 128 until the vent passage 139 becomes aligned with the groove 134 thereby venting the interior of the suction cups and releasing the insert as mentioned above.

The lower end of the released insert falls through an opening 148 between a plurality of article depressing bars 149 and 150 (FIG. 3), and onto a tier of articles being moved into loading position by one of the tiering finger units 37. The bars 149 (only one being shown) are mounted in any suitable way on the frame of the case packing machine 22, and the bars 150 (only one being shown) have upwardly projecting members 150a supported for vertical movement in brackets 151 and urged downwardly by springs 152 to bear against the articles and maintain them in tiered condition. The brackets 151 are secured to the transverse member 112 of the frame 50.

As will be described in more detail later, each tiering finger unit 37 moves a tier of articles onto the floor 153 (FIG. 3) of a loading chute 154 past the opening 148, and then moves away from the tier of articles. The insert then falls between the tier of articles and two transversely spaced leaf springs 156 (only one being shown in FIG. 3) which are connected, as by bolting, to the associated side walls 157 and 158 (FIG. 1) of the loading chute 154. When a tier of articles is moved onto the floor 153 of the loading chute 154, the articles first flatten the springs 156 against their associated side walls 157 or 158, and after the articles move past the springs, the forward edges 159 of the springs 156 move toward each other to establish abutments which will not allow the insert to move therepast.

In the operation of the insert positioning apparatus 20, (FIG. 1), the magazine 52 is filled with inserts, and a continuous supply of articles is advanced by the conveyor 27 to the tiering finger units 37. When the apparatus 20 and the case packing machine 22 are arranged to fill cases with two tiers of articles, the operation is as shown in FIGS. 3, 4, and 7 to 11.

With the foremost insert being gripped by the suction cups 123 (FIG. 3) and with the ear 116 of one of the rearwardly moving pusher feet 38 not yet in contact with the pad 114 on the actuating lever 104, a first tier of articles is moved into the position shown in phantom line in FIG. 3 by one of the continuously moving tiering finger units 37. Shortly thereafter, the ear 116 on one of the rearwardly moving pusher feet 38 contacts the pad 114 and moves the lever 104 and the vacuum valve mechanism 118 to the phantom line position of FIG. 4 causing the foremost insert to be carried into and released within the insert discharge channels 83. The insert then slides down the channels 83 and rests against the upper surface of the forwardly moving tier of articles as shown in FIG. 7. The tiering finger unit 37 moves the tier of articles onto the floor 153 of the loading chute 154 forward of the opening 148, allowing the insert I to fall onto the floor between the tier of articles and the leaf springs 156 as indicated in FIG. 8. The first mentioned tiering finger unit 37 then moves away from the first tier as indicated in FIG. 9 and a second tiering finger unit 37 moves a second tier of articles into the loading chute 154 against the insert I as indicated in FIG. 10. The pusher feet 38 then begin their intermittent cycle of operation along the path 39 (FIG. 3) by first dropping down behind the second tier of articles as indicated in FIG. 11 and then pushing the two tiers of articles with the insert therebetween into a case C (FIG. 3). When the pusher feet 38 move downwardly as above-mentioned, the ear 116 will move away from the pad 114 allowing the spring 109 to pivot the insert withdrawing device 100 so that the suction cups 123 will grip another insert. The pusher feet 38 then move along the rectangular path 39 to the position shown in FIG. 3 to start another cycle of operation.

It is apparent that in the above-described machine two tiers of articles with one insert positioned therebetween comprise a case load and are accumulated on the floor 153 of the loading chute 154 before the pusher feet are placed in operation to push the case load into the waiting case C.

In FIGS. 12 to 15 a modified insert positioning apparatus 164 is shown wherein four tiers of articles with three inserts positioned therebetween comprises a case load. Since many of the parts of the apparatus 164 are similar to the parts of the apparatus 20, parts of the apparatus 164 which are equivalent to the parts of the apparatus 20 will be assigned the same numeral followed by the suffix "a." With this apparatus 164 it will be understood that the actuating mechanism for the pusher feet 38a is timed with the movement of the tiering finger units 37a so that four tiers of articles are moved onto the floor 153a of the loading chute 154a before the pusher feet 38a are actuated through a stroke.

A continuously driven cam 165 having three lobes 166, 167 and 168 spaced 90° from each other is secured to a shaft 169 which is driven in timed relation with the movement of the tiering finger units 37a so that the cam 165 is rotated 90° while each tier of articles is being moved onto the floor 153a of the chute 154a. The lever 104a has a cam follower 171 journalled thereon and arranged to ride against the periphery of the cam 165. A spring 172 connected between a portion of the frame of the apparatus 164 and the arm 104a holds the cam follower 171 against the cam 165. When the cam follower is disposed on any of the lobes, as shown in FIG. 15, the lever 104a is moved to a position wherein the suction cups grip an insert and, when the cam follower 171 moves into a valley as shown in FIGS. 12, 13, and 14, the suction cups release the insert.

In the operation of the insert positioning apparatus 164, an insert having first been gripped by the insert withdrawing device 100a when the cam follower 171 is on the lobe 166, is released as the cam follower 171 enters the valley between the lobe 166 and 167 to fall on the first tier of articles as indicated in FIG. 12. The tiering finger unit 37a then advances the first tier of articles past the opening 148a allowing the first insert to fall onto the floor 153a between the first tier and the leaf springs 156a. During this interval, the follower 171 is moved outwardly by the lobe 167 to cause the insert withdrawing device 100a to grip a second insert and drop it on the second tier of articles when the parts are positioned as shown in FIG. 13. This same procedure is then repeated for a third tier of articles and a third insert, thereby positioning the parts as shown in FIG. 14. Since the cam follower 171 is not contacted by a lobe during the next 90° of rotation of the cams 165, it will be apparent that an insert is not gripped or discharged while the fourth tier of articles is being moved onto the floor 153a of the chute 154a. The pusher feet 38a are then actuated through their cycle of operation thereby pushing the case load of four tiers of articles and three inserts into a case and returning the feet 38a to the position shown in FIG. 12 before the next insert is dropped by the unit 100a.

From the foregoing description, it is apparent that the insert positioning apparatus of the present invention automatically positions inserts between tiers of articles before the articles are moved into a case thereby minimizing the possibility of articles being damaged while in the case. The apparatus is inexpensive in construction and its operation may be easily controlled to handle case loads having different numbers of tiers.

While two embodiments of the present invention have been shown and described, it will be understood that various changes and modifications may be made without departing from the spirit of the invention or the scope of the appended claims.

The present invention and the manner in which the same is to be used having thus been described, what is claimed as new and desired to be protected by Letters Patent is:

1. An apparatus for positioning inserts between spaced movable articles comprising article advancing means movable forwardly while engaging one of the articles and rearwardly to effect subsequent engagement with a succeeding article, means for supporting a plurality of inserts above the path of the articles, means for gripping an insert movable means for carrying said gripping means toward and away from said insert supporting means, actuating means for said insert carrying means operatively associated with said article advancing means for operation in timed relation therewith to effect withdrawal of said insert from said insert supporting means, and means for releasing said insert from said gripping means in timed relation with the movement of the articles therebelow.

2. An apparatus for positioning inserts between spaced movable articles comprising means for moving the articles along a predetermined path, a magazine for supporting a plurality of inserts above said path of the articles, a suction cup movable from a position disposed against the foremost insert in said magazine to a position spaced from said magazine, yieldable means urging said suction cup toward the magazine, means for activating said suction cup to grip said foremost insert, means actuated by said article moving means to effect movement of the suction cup and an insert gripped thereby away from said magazine, means for deactivating said suction cup to release said insert after said insert has been removed from said magazine, and means for guiding said insert into position between the spaced articles.

3. An apparatus for positioning inserts between spaced movable articles comprising an inclined magazine for supporting a plurality of inserts above the spaced articles, means in said magazine for urging said inserts toward the lower end of said magazine, resilient means connected to the lower end of said magazine and arranged to engage the lowermost inserts to resist the movement of said inserts through the lower end of said magazine, a suction cup movable from a position engaging the foremost insert in said magazine to a position spaced from said magazine, means for activating said suction cup to grasp said foremost insert, means for deactivating said suction cup to release said insert after said insert has been removed from said magazine, means for guiding said insert into position between the spaced articles, an extension pivoted to the lower end of said guiding means and movable relatively thereto, and spring means yieldably retaining said extension in alignment with the guiding means.

4. An apparatus for positioning inserts between articles comprising means for supporting the articles, means for successively advancing the articles onto said supporting means, means for supporting a plurality of inserts above said article supporting means, means for gripping an insert in said insert supporting means and for removing said gripped insert from said insert supporting means, and means for deactivating said gripping means for releasing said insert onto the upper surface of the foremost article, said article advancing means being arranged to move said foremost article out of supporting engagement with said released insert whereby said insert is enabled to drop between said foremost article and the next approaching article.

5. An apparatus for positioning inserts between articles comprising means for supporting articles, means for successively advancing articles onto said supporting means and thereafter for substantially closing the space between successive articles accumulated on said supporting means, means for supporting a plurality of inserts above said article supporting means, means for gripping and removing an insert from said insert supporting means, means for deactivating said gripping means for releasing said insert from said gripping means, and means for guiding said insert downwardly onto the upper surface of the foremost article, said article advancing means being arranged to move said foremost article out of supporting engagement with said released insert, said insert dropping between said foremost article and the next approaching article before the space between said articles is closed.

6. An apparatus for positioning inserts between articles comprising means for supporting articles in alignment with a case to be filled, means for successively advancing articles onto said supporting means and thereafter for substantially closing the space between successive articles accumulated on said supporting means, means for supporting a plurality of inserts above said article supporting means, means for gripping and removing an insert from said insert supporting means, means for deactivating said gripping means for releasing said insert from said gripping means, means for guiding said insert downwardly onto the upper surface of the foremost article and for holding said insert from movement with said foremost article while said foremost article is being moved on said article supporting means, said article advancing means being arranged to move said foremost article out of supporting engagement with said released insert whereby said insert is enabled to drop between said foremost article and the next approaching article while said next approaching article is spaced from said foremost article.

7. An apparatus for positioning inserts between spaced articles comprising means for supporting articles in alignment with a case to be filled, means for successively advancing articles onto said supporting means and thereafter for substantially closing the space between successive articles accumulated on said supporting means, an inclined magazine for supporting a plurality of inserts above the spaced moving articles, means urging said inserts toward the lower discharge end of said magazine, resilient means at the discharge end of said magazine for resisting movement of said inserts from said magazine, a lever pivotally supported by said magazine adjacent the discharge end thereof, a suction cup pivotally supported by said lever, resilient means urging said cup against the foremost insert in said magazine, means for activating said suction cup to grip the foremost insert in said magazine, means for deactivating said suction cup when said lever has been pivoted to a position wherein said cup has removed said foremost insert from said magazine, and pusher means timed with the movement of said article advancing means and arranged to pivot said lever with said cup and the foremost insert gripped thereto away from said magazine to deactivate said cup and release said insert for acceptance between adjacent articles, said pusher means being activated upon accumulation of a case load on said article supporting means to push said case load along said article supporting means into said case.

References Cited in the file of this patent

UNITED STATES PATENTS

| | | |
|---|---|---|
| 1,587,417 | Reyes | June 1, 1926 |
| 2,254,097 | Wood | Aug. 26, 1941 |
| 2,492,894 | Schrader | Dec. 27, 1949 |
| 2,615,289 | Hickin | Oct. 28, 1952 |